United States Patent [19]

Salenbien et al.

[11] Patent Number: 4,932,642
[45] Date of Patent: Jun. 12, 1990

[54] WORKPIECE SUPPORT TOOLING

[75] Inventors: Leonard J. Salenbien, Saline; Larry J. Ketola, Milan, both of Mich.

[73] Assignee: Hines Industries, Inc., Ann Arbor, Mich.

[21] Appl. No.: 401,986

[22] Filed: Sep. 1, 1989

Related U.S. Application Data

[63] Continuation-in-part of Ser. No. 182,739, Apr. 12, 1988, abandoned.

[51] Int. Cl.⁵ .................................................. B23Q 3/02
[52] U.S. Cl. .................................. 269/133; 269/48.1; 269/234; 269/309; 269/310
[58] Field of Search .............. 269/32, 43, 48.1, 52, 269/217, 234, 309, 310, 133; 279/1 A, 2 R; 228/49.3

[56] References Cited

U.S. PATENT DOCUMENTS

| 649,785 | 5/1900 | Weinert | 269/133 |
| 3,385,592 | 5/1968 | Hasell et al. | 269/133 |
| 4,577,847 | 3/1986 | Schedwin | 269/309 |

FOREIGN PATENT DOCUMENTS 722698  3/1980  U.S.S.R.

Primary Examiner—Judy Hartman
Attorney, Agent, or Firm—Emch, Schaffer, Schaub & Porcello Co.

[57] ABSTRACT

An improved workpiece support tooling for a balancing machine is disclosed having a unique two point contact system for the workpiece. The two point contact system provides extremely accurate centering and leveling of the workpiece with respect to the unbalance detection plane of the balancing machine. The support tooling of the present invention is also easily adaptable to various weights and geometric of workpiece.

6 Claims, 5 Drawing Sheets

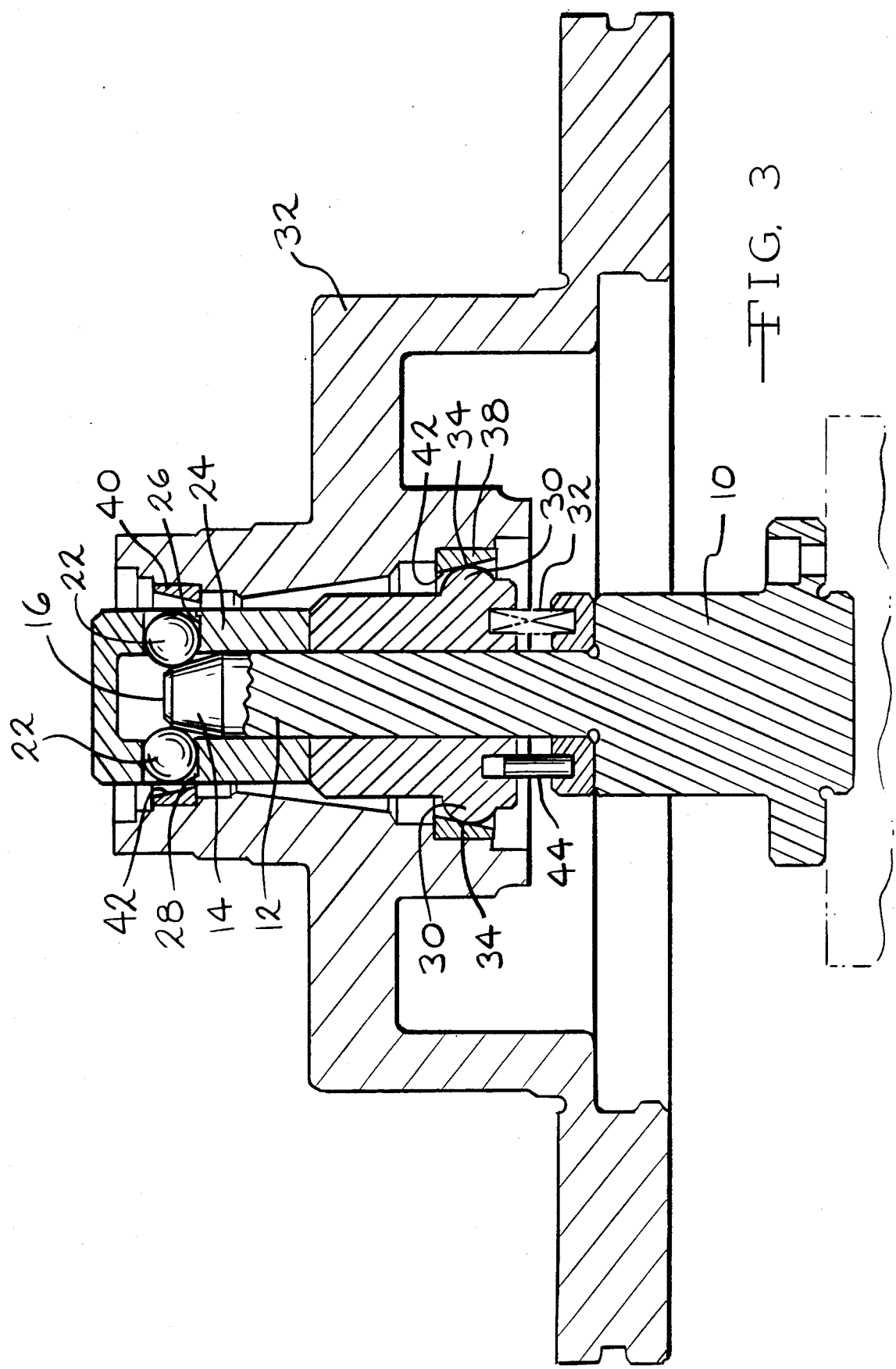

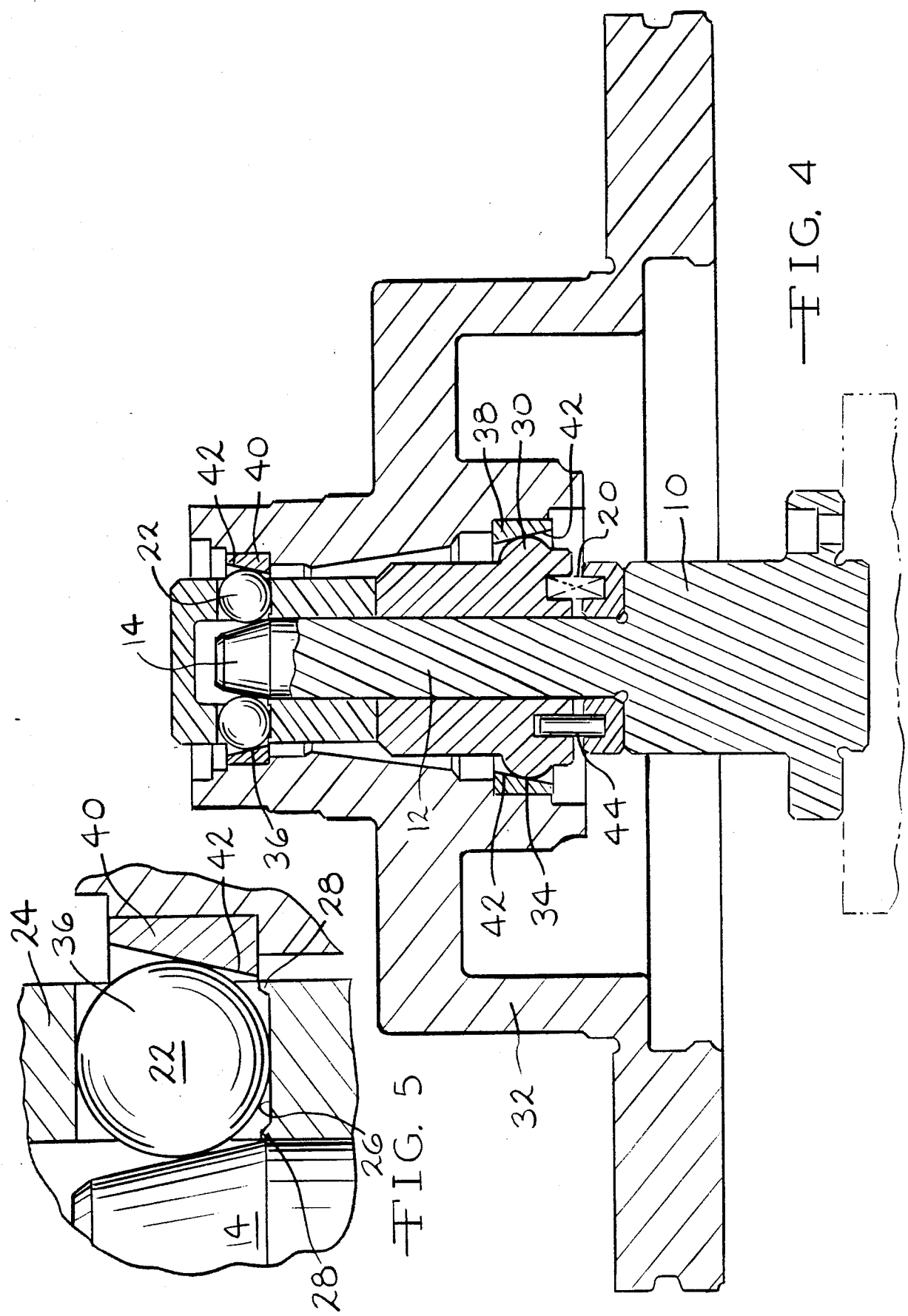

WORKPIECE SUPPORT TOOLING

This application is a continuation-in-part of our co-pending application Ser. No. 07/182,739, filed April 12, 1988, now abandoned.

BACKGROUND OF THE INVENTION

The present invention relates to improved tooling for supporting a workpiece during a machining process. Such support tooling is important in applications where the workpiece must receive accurate centering and leveling support. For instance, the design of support tooling is critical for balancing machines used in providing either static unbalance measurements or dynamic unbalance measurements of workpieces of specified shape and geometry. Such workpiece support tooling must be specifically adapted to the specified geometry and weight of the workpiece. Thus, for every given workpiece, a special support tool must be designed and manufactured. If a given machine is intended to be used with more than one style of workpiece, different tooling must be provided to be interchanged when the workpiece changeover occurs. Very seldom does the tooling designed for one specific type of workpiece have the necessary dimensional components to provide proper support for a second specified type of workpiece.

Workpiece support tooling design is critical in many machine operations in that it must provide for proper centering and leveling of the workpiece on the machine in order to establish accuracy in the given machine operations. The workpiece support tooling of the present invention provides a unique quick-change support tooling easily adaptable to various geometries and weights of workpieces and capable of providing appropriate support, leveling and centering of the workpiece on a machine during machine operations.

SUMMARY OF THE INVENTION

The tooling of the present invention provides an improved gripping mechanism for use with workpieces having open bores as hubs, elongated bores, and elongated shafts. The tooling quickly centers and levels a workpiece and allows for easy removal of the workpiece by means of a unique two point contact system. The two contact points are axially separated to achieve the desired leveling and centering of the workpiece. The support tooling of the present invention includes a spring-loaded sleeve member designed to engage the workpiece at a specific contact point about the shaft or bore of the workpiece. The weight of the workpiece drives the sleeve member to a second location, thereby causing a plurality of ball bearing members to move radially and engage the bore or shaft of the workpiece at a second point of contact. The radial distances moved by each of the ball bearing are all equivalent thereby, upon engaging the workpiece, forcing the workpiece to become centered about the axis of the support tooling. The two primary contact points, while centering the workpiece about the axis of the support tooling also force the workpiece to maintain a level relationship with respect to the axis of the support tooling. There is no reliance by the present invention to support the workpiece by engaging anything other than the two points of contact. The workpiece can easily be lifted off of the tooling after the machining operation is completed.

BRIEF DESCRIPTION OF THE DRAWINGS

FIG. 3 is a side cutaway view of the workpiece support tooling of the present invention with a typical workpiece in a first position in contact with the tooling at one location.

FIG. 4 is a side cutaway view of the workpiece support tooling of the present invention with a typical workpiece in a supported position in contact with the tooling at two locations.

FIG. 5 is a detailed view of a ball bearing member of the workpiece support tooling of the present invention in contact with the typical workpiece.

DETAILED DESCRIPTION OF THE DRAWINGS

Figure 1:
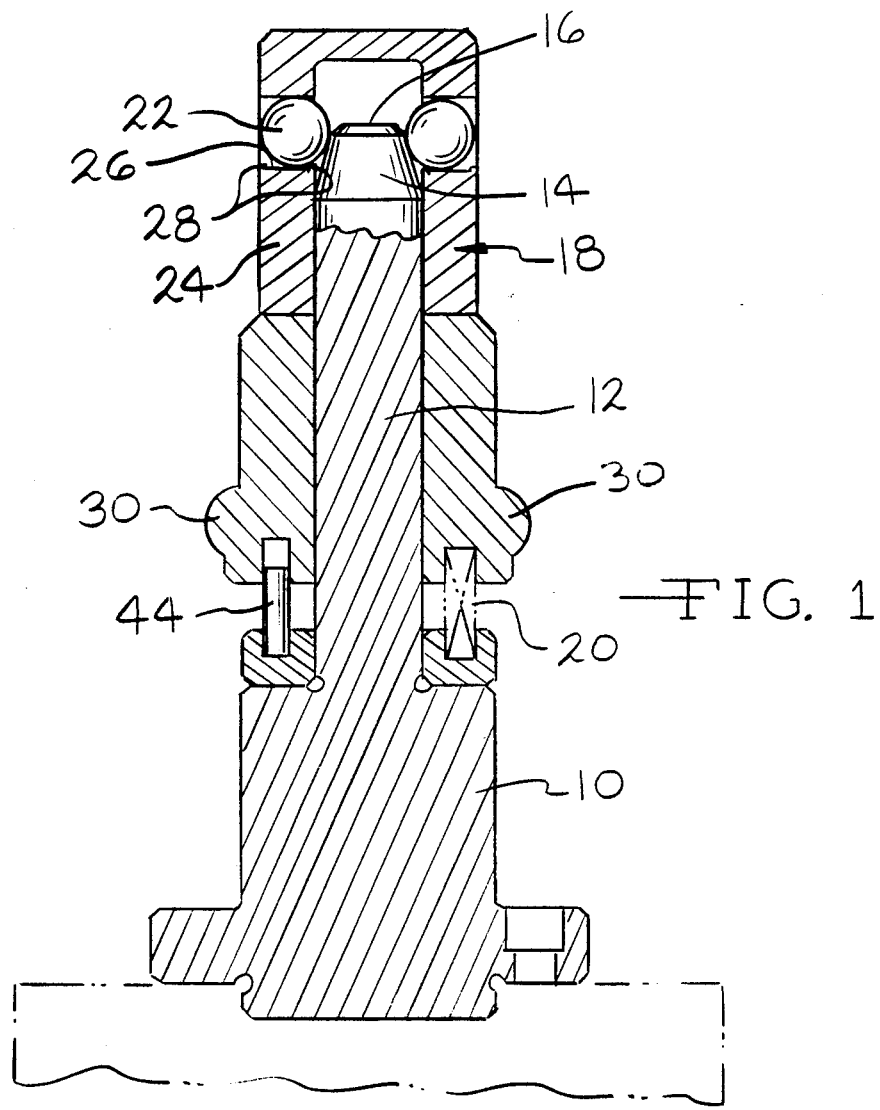
FIG. 1 is a side cutaway view of the workpiece support tooling of the present invention.
Figure 2:
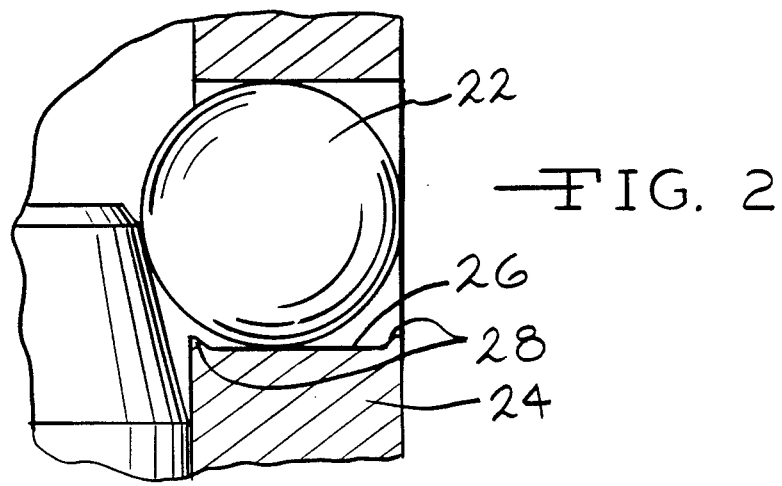
FIG. 2 is a closeup detailed view of a ball bearing member of the workpiece support tooling of the present invention.

Referring to FIG. 1, a preferred embodiment of the workpiece support tooling of the present invention provides a base member 10 with an axially extending post member 12. The free end 14 of the post member 12 is concentrically tapered toward its axis to provide aa reduced diameter at the tip 16 of the post member 12. A sleeve member 18, positioned over and encompassing the post member 12, is designed to move axially with respect to the post member 12. The sleeve member 18 is supported by at least one spring member 20 interposed between the sleeve member 18 and the base member 10. A locking member 44 located between the sleeve member 18 and the base member 10 is used to interlock the sleeve member 18 with the base member 10 and prevent rotation of the sleeve member 18 with respect to the post member 12. A plurality of ball bearing members 22 are positioned in the wall 24 of the sleeve member 12 adjacent the tapered free end 14 of the post member 12.

The ball bearing members 22 are each retained in the wall 24 by means of a radially extending race 26 with stops 28 located at the interior and exterior surfaces of the wall 24. The ball bearing members 22 freely move radially in their respective races 26 and are retained in the wall 24 by the stops 28. The width of the wall 24 is designed to provide the ball bearing members 22 freedom of radial movement in their respective races 26, thereby providing the ball bearing members 22 the ability to radially move with respect to their axial location while engaging the tapered free end 14 of the post member 12. For instance, referring to FIG. 3, if the ball bearing members 22 are located proximate the tip 16 of the tapered free end 14 of the post member 12 they are in an inwardly oriented position in their respective races 26. If, however, referring to FIG. 4, the ball bearing members 22 are located proximate the widest portion of the tapered free end 14 of the post member 12, they are oriented outwardly in their respective races 26 and extend beyond the exterior surface of the wall 24 of the sleeve member 18.

A circumferential ridge 30 extends radially outward from the exterior of the sleeve member 18 wall 24 at a location proximate the bottom of the sleeve member 18 and spaced from the ball bearing member 22. This circumferential ridge 30 engages the workpiece 32 to provide a first point of contact 34 between the sleeve member 18 and workpiece 32.

Referring now to FIG. 3, the workpiece support tooling of the present invention is shown having a workpiece 32 placed thereon. The circumferential ridge 30 engages the workpiece 32 at the first point of contact 34. The workpiece 32 is centered around the axis of the support tooling due to the equidistant radius of the first point of contact 34 between the workpiece 32 and ridges 30. There is no other contact between the workpiece 32 and support tooling as the ball bearing members 22 have not yet moved radially outward to engage the workpiece 32.

Referring now to FIG. 4, it can be seen that the weight of the workpiece 32 has overcome the force(s) exerted by the spring member(s) 20 and the sleeve member 18 has moved in a downward axial direction along the post member 12. As the sleeve member 18 moves downward, the tapered free end 14 of the post member 12 forces the ball bearings members 22 radially outward in equidistant amounts until the ball bearing members 22 engage the interior surface of the workpiece 32 at a second point of contact 36. Again, since the radial movement of the ball bearing members 22 is equidistant, the workpiece 32 is maintained centered with respect to the axis of the workpiece support tooling. Finally, the workpiece 32 is engaged with the support tooling at two locations 34, 36, resulting in the workpiece being leveled with respect to the axis of the support tooling.

The exterior or shape and size of the sleeve member 18 of the workpiece support tooling can be designed to accomodate any geometry and shape of workpiece 32. The base 10 and post members 12 are universal to the variety of sleeve member 18.

As an alternative embodiment of the present invention, the exterior shape and size of the sleeve members 18 can remain constant yet workpieces having varied geometries and shapes can be adapted to engage the support tooling at contact points 34, 36. A pair of tapered inlays 38, 40 are provided which are designed to conform to the interior surface of the workpiece 32 and provide the engagement with the ridge 30 and ball bearing members 22 at the first and second contact points 34, 36. The first inlay 38 is machined to fit the workpiece at a specified location to engage the circumferential ridge 30 at the first contact point 34. The second inlay 40 is machined to provide the necessary second point of contact 36 between the workpiece 32 and the radially moving ball bearing members 22. Of course, the second inlay 40 may not be necessary if the radially moving ball bearing members 22 can engage the interior surface of the workpiece 32 as the sleeve is moved downward on the post member 12. These inlay member 38, 40 can be machined with a tapered engagement surface 42 to provide smooth engagement with the circumferential ridge 30 and with the ball bearing members 22 as they are pressed radially outward by the tapered free end 14 of the post member 12. The inlay 38, 40 may be inserted into the workpiece 32 as part of the manufacturing process prior to the balancing operation and may be removed from the workpiece 32 after the balancing operation is completed.

Figure 6:
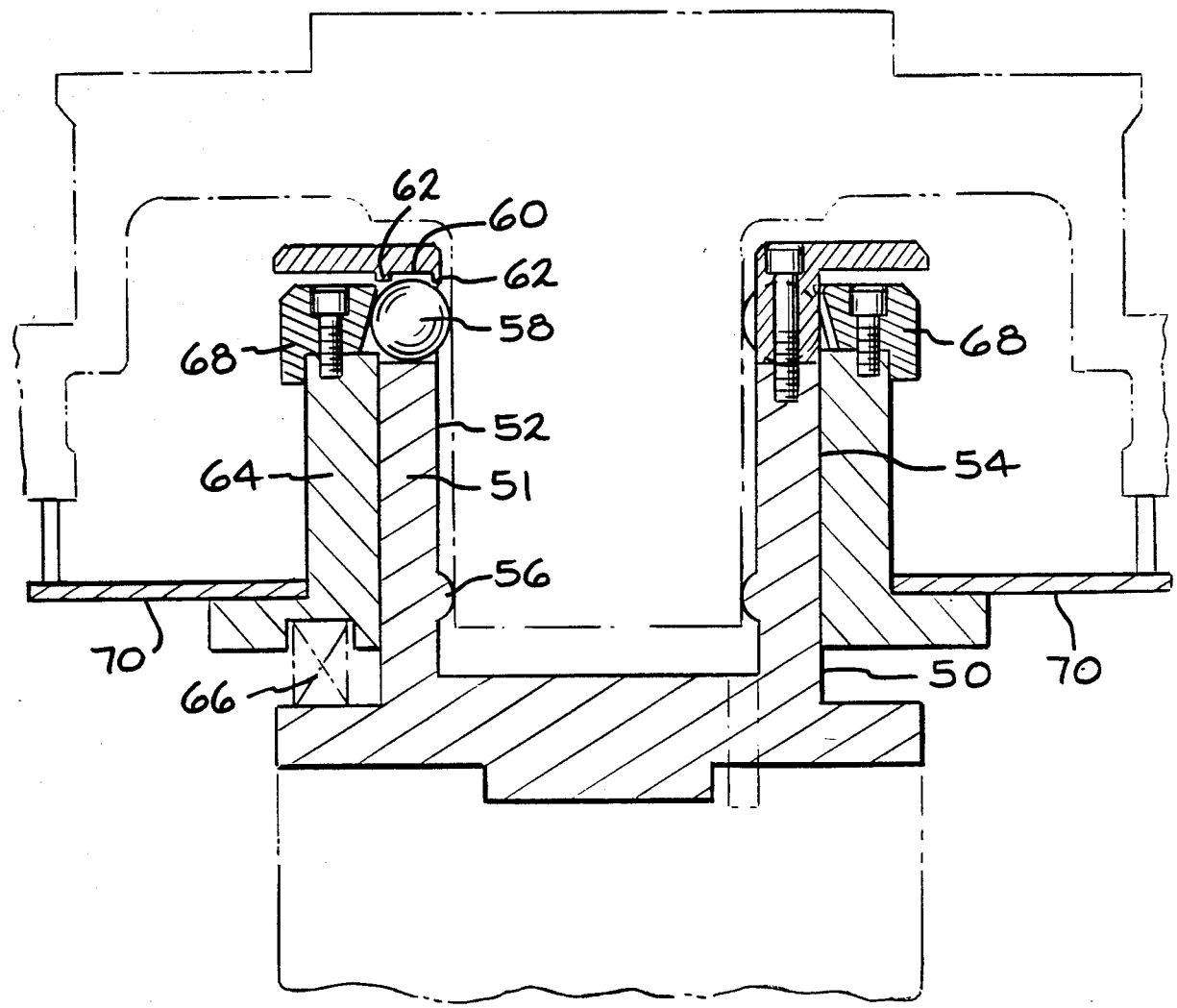
FIG. 6 is a side cutaway view of an alternative embodiment of the workpiece support tooling of the present invention.

Referring now to FIG. 6, an alternative embodiment of the present invention includes a cup-shaped base member 50 having a wall 51 with an inside diameter surface 52 and an outside diameter surface 54. A circumferential ridge 56 extends radially inward from the inside diameter surface 52 at a location proximate the bottom of the base member 50. A plurality of ball bearing members 58 are positioned in the wall 51 of the base member 50 adjacent the top of the base member 50. The ball bearing members 58 are each retained in the wall 51 by means of a radially extending race 60. Each ball bearing member 58 is free to move in a radial direction within its race 60 and is retained in its race 60 by stops 62.

A sleeve member 64 surrounds the base member 50 and is designed to move axially with respect to the base member 50. The sleeve member 64 is supported by at least one spring member 66 interposed between the sleeve member 64 and the base member 50. A tapered member 68 is fixed to the top of the sleeve member 64 to engage the ball bearing members 58. As the sleeve member 64 moves in a downward direction with respect to the base member 50, the tapered member 68 presses the ball bearing members 58 radially inward. A concentric mounting member 70 designed to engage the workpiece extends from said sleeve member 64. The workpiece rests upon the mounting member 70. The center of the workpiece is inserted into the open center of the base member 50. The weight of the workpiece presses the sleeve member 64 downward thus forcing the ball bearing members 58 radially inward to engage the workpiece center. The workpiece center is also engaged at a second point of contact by the circumferential ridge 56. The workpiece is thus engaged with the support tooling at two of contact spaced equidistantly from the axis of the support tooling and the workpiece is maintained level and centered with respect to the axis of the support tooling.

Figure 7:
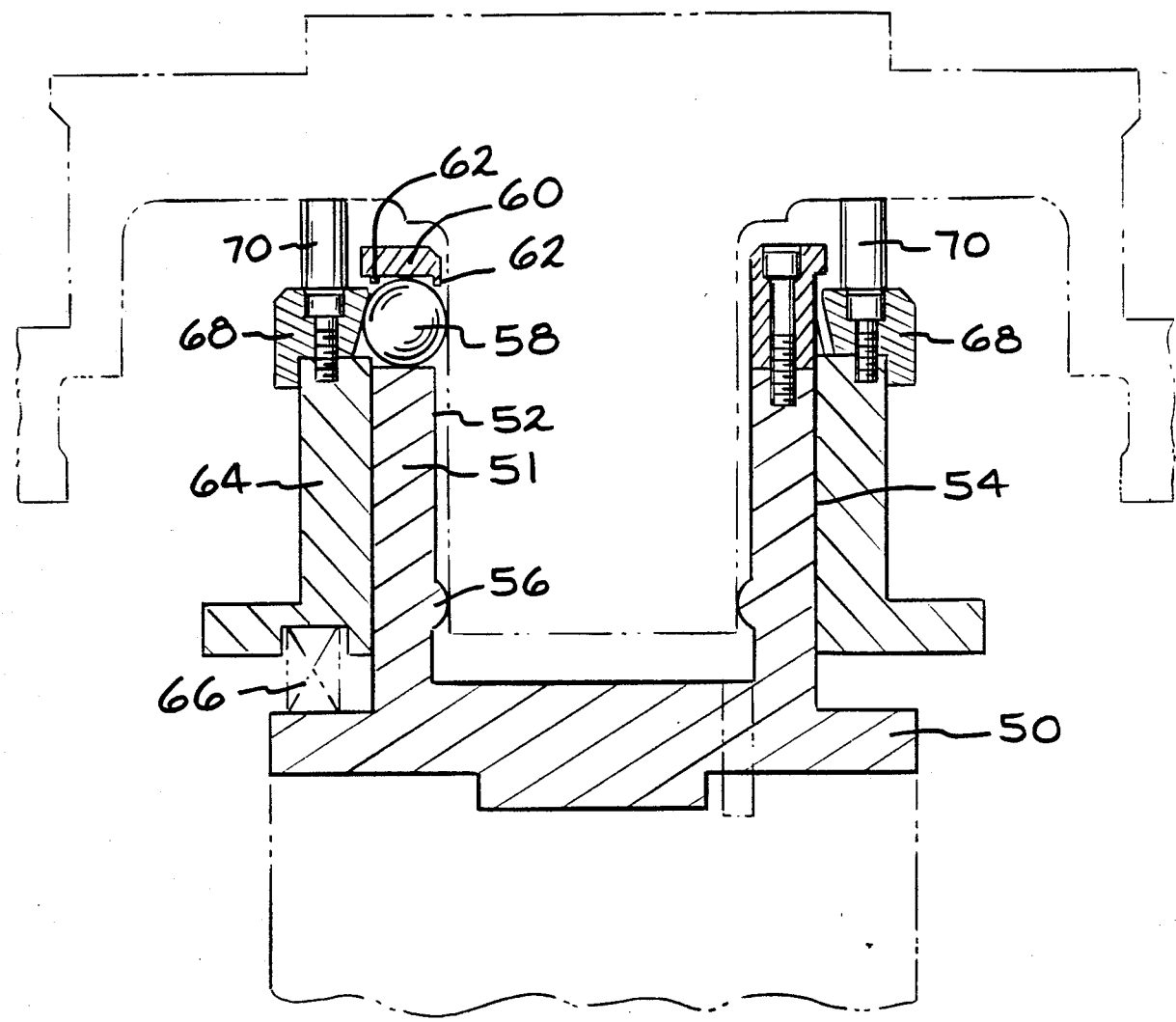
FIG. 7 is an alternative embodiment of FIG. 6.

Referring now to FIG. 7, the same tooling of FIG. 6 is shown wherein the mounting member 70 is located in an alternative position on the sleeve member 64 to engage the workpiece.

Other aspects and embodiments of the present invention may be obvious having viewed this particular detailed description of the present invention. However, this detailed description is intended to be educational and instructive and is not intended to be limiting upon the scope and content of the following claims.

We claim:

1. A workpiece support tool comprising, in combination:
   a base member having an axially extending post, the end of said post being radially tapered toward its tip around the axial centerline of said post;
   a sleeve member for placement over said post and resilient means for supporting said sleeve member on said base member, said sleeve member including a plurality of radially extending races, each race designed to retain a bearing member for radial movement within said sleeve, said radially extending races and respective bearing members being spaced radially around the centerline of said post proximate said tapered end, said sleeve member further including a concentric ridge spaced from said bearing members and extending around the exterior surface of said sleeve member, wherein a workpiece having a central axial bore when placed upon said support tool first engages said ridge forming a first point of contact with such bore, and the weight of such workpiece exerts a force overcoming said resilient means causing said sleeve member to move axially with respect to said post, thereby engaging said bearing members with said expanding tapered end of said post and forcing said bearing members to move radially outward to engage such workpiece at a second point of contact so that such workpiece is maintained in a centered and level orientation with respect to such tooling by said ridge and bearing members.

2. The tool of claim 1, wherein said resilient means includes at least one spring member located between said sleeve member and said post.

3. The tool of claim 1, further including an alignment member located between said base member and said sleeve member to prevent relative rotation between said sleeve member and said base member.

4. The tool of claim 1, further including a first ring member having an outside dimension designed to mate within such workpiece bore and having an inside dimension of a lessening diameter taper as such workpiece is mated with said ring member and placed in postion over said sleeve wherein such lessening diamter taper causes the interior surface of said ring member to gradually engage said ridge of said sleeve member as such workpiece is moved with respect to said sleeve, whereby the weight of such workpiece exerts a force overcoming said resilient means as said ring member and said ridge become fully engaged and causes said sleeve member and such engaged workpiece to move axially with respect to said post thereby forcing said bearing members to move radially outward by their engagement with said tapered end of said post and engage such workpiece at a second point spaced from said point of engagement between said ridge and ring member.

5. The tool of claim 4, further including a second ring member having an outside dimension designed to mate within such workpiece at a location adjacent said bearing members when said first ring member is engaged with said ridge, said second ring member having an inside dimension defining a reverse taper opposed to said taper end of said post, wherein said bearing members move radially outward as they move down said tapered post to engage said reverse taper inside dimension of said second ring member.

6. A workpiece support tool comprising in combination:
   a cup-shaped base member having a concentric wall with an inside diameter an outside diameter;
   a plurality of radically extending races positioned in said wall and spaced radially around the centerline of said base member, each race designed to retain a bearing member for radial movement within said wall;
   a concentric ridge spaced from said bearing members and extending around the inside diameter of said wall;
   a sleeve member encompassing said wall for moving axially with respect to said base member, said sleeve member including a tapered surface for engaging said bearing members and pressing said bearing members radially inward when said sleeve member moves axially downward with respect to said base member; and,
   at least one resilient member located between said sleeve member and said base member, wherein a workpiece having an elongated hub when placed upon said sleeve member first engages said concentric ridge forming a first point of contact with such hub of such workpiece and the weight of such workpiece exerts a force overcoming said resilient means causing said sleeve member to move in a downward direction with respect to said cup member, thereby engaging said tapered surface of said sleeve member with said bearing members forcing said bearing members to move radially inward to engage such workpiece at a second point of contact with such hub of such workpiece so that such workpiece is maintained in a centered and level orientation with respect to such tool by said ridge member and said bearing members.

* * * * *